(No Model.) 2 Sheets—Sheet 1.
W. T. CARROLL.
REVERSING MECHANISM FOR COUNTER-SHAFTING.
No. 443,821. Patented Dec. 30, 1890.
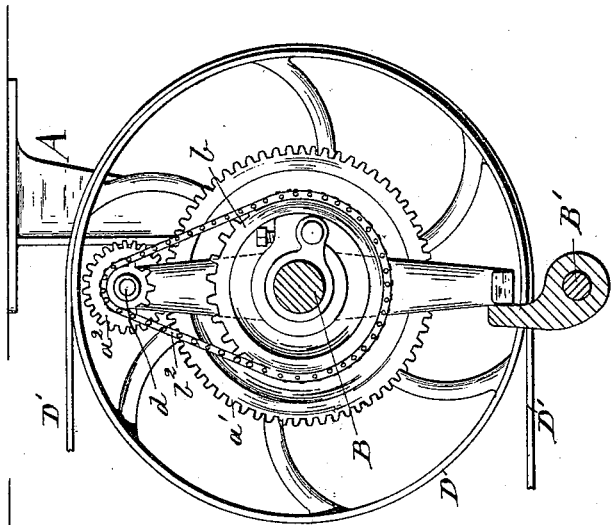
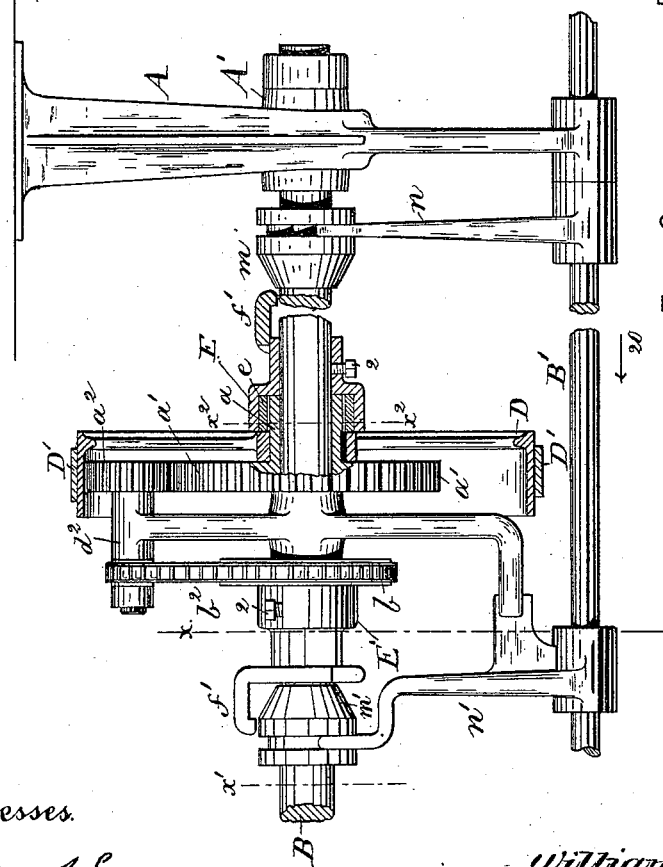
Witnesses.
Frederick L. Emery
Fred S. Greenleaf
Inventor.
William T. Carroll
by Crosby & Gregory
Attys.

(No Model.) 2 Sheets—Sheet 2.
W. T. CARROLL.
REVERSING MECHANISM FOR COUNTER-SHAFTING.
No. 443,821. Patented Dec. 30, 1890.
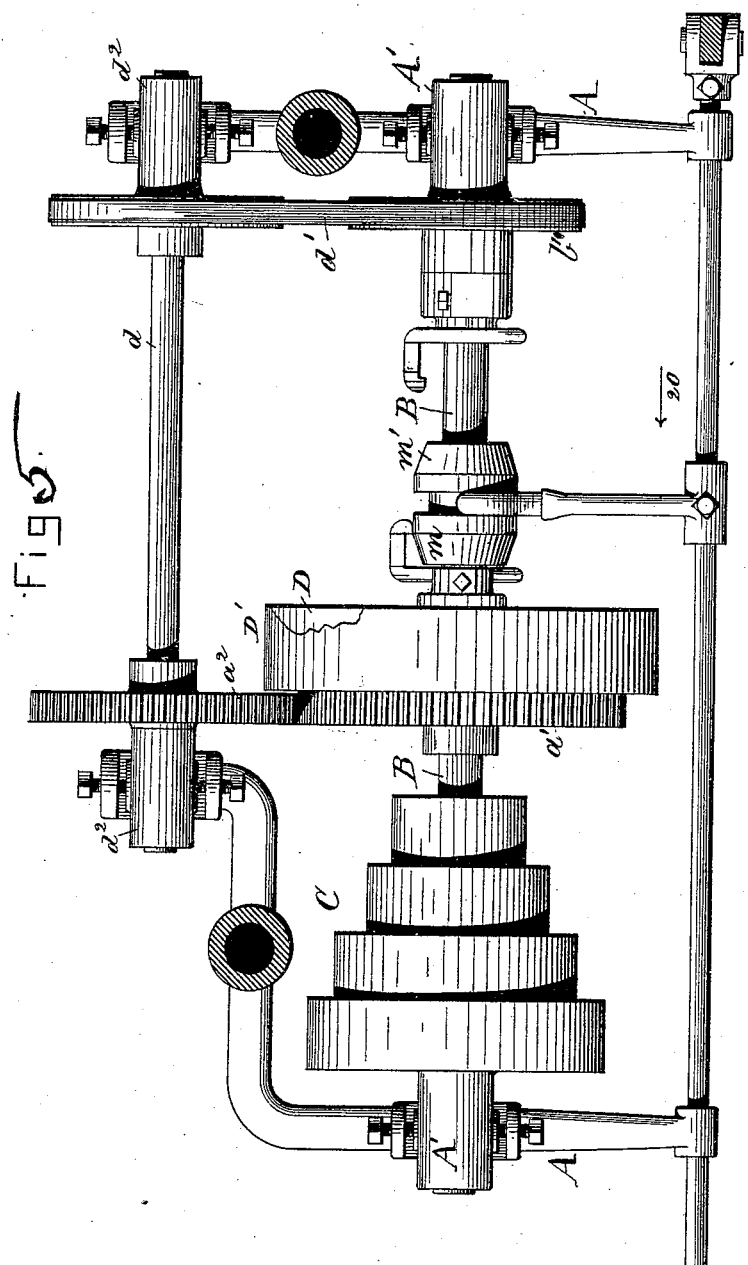
Witnesses
Frederick L. Emery
Fred S. Greenleaf
Inventor
William T. Carroll
by Crosby & Gregory
Attys.

UNITED STATES PATENT OFFICE.

WILLIAM T. CARROLL, OF WORCESTER, MASSACHUSETTS.

REVERSING MECHANISM FOR COUNTER-SHAFTING.

SPECIFICATION forming part of Letters Patent No. 443,821, dated December 30, 1890.

Application filed May 29, 1890. Serial No. 353,522. (No model.)

*To all whom it may concern:*

Be it known that I, WILLIAM T. CARROLL, of Worcester, county of Worcester, State of Massachusetts, have invented an Improvement in Reversing Mechanism for Counter-Shafting, of which the following description, in connection with the accompanying drawings, is a specification, like letters on the drawings representing like parts.

This invention has for its object the production of novel mechanism for reversing shafting, more especially counter-shafts for driving machinery.

In accordance with my invention I have provided the counter-shaft with two oppositely-rotating loose pulleys and with two clutches, which are fast on the shaft, either of which clutches may be connected to the hubs of either of the pulleys to thus cause the pulley which is engaged by the clutch to rotate the shaft in one or the other direction.

Figure 1 in partial elevation and section represents a hanger, a counter-shaft, and mechanism which I have devised to rotate the said shaft in one or the other direction, as desired; Fig. 2, a section in the line $x$; Fig. 3, a section at the right of the line $x'$, the cone being removed; Fig. 4, a section to the right of the line $x^2$; Fig. 5, a modification of my invention, to be described.

The hangers A to support the boxes A' for the counter-shaft B and shipper-rod B' are and may be of any usual construction, as may also be the pulleys fast on the said shaft, the pulleys being herein shown only in Fig. 5, and as a conical nest C.

The shaft B is surrounded loosely by a suitable driven pulley D, the hub of which is in practice connected to the hub $a$ of a gear $a'$, which runs loose on the counter-shaft B. This shaft also has mounted loosely upon it a second gear $b$, preferably toothed, as in Figs. 1 and 2, but which may be plain surfaced at its periphery, as in Fig. 5. The toothed gear $a'$ engages a gear $a^2$, fast on the reversing-shaft $d$, having suitable bearings $d^2$, adapted to sustain the said shaft parallel to the shaft B.

The pulley D has its periphery shaped to receive any usual belt D'.

It will be understood by those conversant with gearing that when the pulley D is rotated in one direction the reversing-shaft through the gearing described will rotate the gear $b$ in the reverse direction on the shaft B.

The sleeve-like end of the hub $a$ of the gear $a'$ and the sleeve-like end of the gear $b$ each enter, respectively, the like clutch-straps $e$ of like clutch-carriers E E', each secured by a suitable set-screw 2 to the shaft B.

Each clutch-carrier has a rock-shaft $f$, having near one end (see Fig. 4) a cam or eccentric to act on the ear 3 at the free end of the clutch-strap $e$, the opposite ear 4 of the said strap being entered by or acted upon by the screw 5, so as to hold the said strap in place at that end.

The strap normally does not touch the hub of the rotating pulley within it; but the said strap may be tightened or closed on the said hub, and then the clutch-carrier fast on the shaft B will be started and rotate the said strap in one or the other direction, according to which of the gear-hubs is engaged or clutched to make it the driver for the shaft B.

The rock-shaft $f$ referred to has near one end an arm $f'$, acted upon by a spring $f^3$, and to turn this rock-shaft in the direction to close the clutch-strap I have provided the shaft B with two cones $m$ $m'$, each under the control of a suitable arm, as $n$ or $n'$ on the shipper-rod B'. These cones are loose on the shaft B, and are so arranged reversely that when the shipper-rod is moved in one direction—as, for instance, the direction of the arrow 20 in Fig. 1—the cone $m$ will be operative and will by acting on the arm $f'$ turn the rock-shaft $f$ and cause the clutch-strap $e$, surrounding the hub of the gear $a'$, to clutch that gear and make it drive the shaft B; but when the movement of the shipper-rod is reversed the cone $m'$ will operate the corresponding lever $f''$ near it and cause the clutch-strap $e$ to surround the hub of the gear $b$, causing that gear to be clutched to the shaft B and become its driver.

The clutch-strap, the shaft $f$, and the hub in which the said strap and shaft are placed constitute what I denominate a "clutch" device.

This invention is not limited to the exact form of clutch shown, and instead I may use any well-known equivalent clutch.

In Figs. 1 and 2 the teeth of the gear $b$ are of such shape as to be engaged by a sprocket-chain $b^2$, whereas in Fig. 5 the rotation of the gear $b^\times$, corresponding with gear $b$, Fig. 1, from the reversing-shaft $d^\times$, corresponding to shaft $d$, is by means of a belt $d'$.

In Fig. 5 the cone $m^\times m'^\times$, the equivalents of cones $m\ m'$, are connected together and arranged on the shaft B between the pulleys $D^\times$ and $b^\times$ and between the rock-shafts $f''^\times$ $f'^\times$ of the clutch parts which are supposed to be just the same as the rock-shafts $f''$ and co-operating clutch parts shown in Figs. 1 to 4.

I claim—

In a reversing mechanism for shafting, the counter-shaft B, a driver-pulley and a belt-gear, both loose on said shaft and having extended hubs, a toothed wheel carried by the said driven pulley, connecting means intermediate the toothed wheel of the driven pulley and the belt-gear loose on the counter-shaft, oppositely-surfaced cones sliding on the counter-shaft, and means to move them simultaneously, combined with two clutch devices co-operating with the hub of the said driven pulley and the hub of said belt-gear, respectively, whereby one or the other of the said hubs is clamped, as desired, by one or the other of said clutches, to thus rotate the shaft B in one or the other direction, substantially as described.

In testimony whereof I have signed my name to this specification in the presence of two subscribing witnesses.

WILLIAM T. CARROLL.

Witnesses:
C. F. STEVENS,
W. L. ECCLES.